(12) United States Patent
Baker et al.

(10) Patent No.: US 10,609,089 B1
(45) Date of Patent: Mar. 31, 2020

(54) INFLUENCING THE LOCATION OF CONTRABAND WIRELESS COMMUNICATIONS DEVICES WITHIN CONTROLLED-ENVIRONMENT FACILITIES

(71) Applicant: Securus Technologies, Inc., Carrollton, TX (US)

(72) Inventors: Mark Baker, Palm Bay, FL (US); Mark Landon Wasson, Frankford, KY (US)

(73) Assignee: Securus Technologies, Inc., Carrollton, TX (US)

( * ) Notice: Subject to any disclaimer, the term of this patent is extended or adjusted under 35 U.S.C. 154(b) by 125 days.

(21) Appl. No.: 15/849,282

(22) Filed: Dec. 20, 2017

(51) Int. Cl.
*H04L 29/06* (2006.01)
*H04L 12/26* (2006.01)
*H04W 4/02* (2018.01)
*H04M 3/22* (2006.01)
*G06Q 50/26* (2012.01)
*G06Q 10/10* (2012.01)

(52) U.S. Cl.
CPC ............ *H04L 63/306* (2013.01); *H04L 43/04* (2013.01); *H04L 63/10* (2013.01); *H04L 63/302* (2013.01); *H04L 63/304* (2013.01); *H04M 3/2281* (2013.01); *H04W 4/02* (2013.01); *G06Q 10/1095* (2013.01); *G06Q 50/26* (2013.01); *H04M 3/22* (2013.01)

(58) Field of Classification Search
CPC ....... H04M 3/2281; H04W 4/04; H04L 63/10; G06Q 10/1095
See application file for complete search history.

(56) References Cited

U.S. PATENT DOCUMENTS

| | | | |
|---|---|---|---|
| 8,099,080 B1* | 1/2012 | Rae | H04M 1/72569 340/571 |
| 9,094,500 B1* | 7/2015 | Edwards | H04M 3/2281 |
| 9,300,791 B1* | 3/2016 | Higgs | H04M 3/2281 |
| 9,380,082 B1* | 6/2016 | Keiser | H04N 7/181 |
| 9,426,303 B1* | 8/2016 | Edwards | H04M 11/00 |
| 9,836,589 B1* | 12/2017 | Orr | G06F 21/31 |
| 9,854,087 B1* | 12/2017 | Solid | H04M 3/2281 |
| 9,900,428 B1* | 2/2018 | Hodge | H04M 3/205 |
| 9,912,821 B1* | 3/2018 | Hodge | H04M 15/88 |
| 9,916,462 B1* | 3/2018 | Edwards | G06F 21/606 |
| 10,063,700 B1* | 8/2018 | Keiser | G06K 9/00087 |
| 10,129,397 B1* | 11/2018 | Keiser | H04M 7/003 |
| 10,205,826 B1* | 2/2019 | Keiser | H04M 3/42365 |
| 10,249,202 B1* | 4/2019 | Passe | H04W 4/024 |
| 10,250,645 B1* | 4/2019 | Smith | H04L 63/205 |

(Continued)

*Primary Examiner* — Lashonda T Jacobs
(74) *Attorney, Agent, or Firm* — Fogarty LLP

(57) ABSTRACT

Systems and methods for identifying individuals using contraband communications devices in a controlled-environment facility are disclosed. Wireless communications are intercepted using a plurality of access points positioned at different locations within the controlled-environment facility. All wireless communications are blocked in a first group of locations, and individuals assigned to the first group of locations are identified. Some or all wireless communications are allowed in a second group of locations. Individuals are identified as possible contraband sources if they move from the first group of locations to one of the second group of locations after wireless communications are allowed in the second group of locations.

21 Claims, 6 Drawing Sheets

(56) References Cited

U.S. PATENT DOCUMENTS

| | | | | |
|---|---|---|---|---|
| 10,270,905 B1* | 4/2019 | Keiser | | H04M 3/4365 |
| 10,270,906 B1* | 4/2019 | Keiser | | H04M 3/4365 |
| 10,282,935 B2* | 5/2019 | Peters | | G07F 17/00 |
| 2008/0000966 A1* | 1/2008 | Keiser | | G06Q 10/10 |
| | | | | 235/382 |
| 2008/0057976 A1* | 3/2008 | Rae | | H04W 64/003 |
| | | | | 455/456.1 |
| 2008/0201158 A1* | 8/2008 | Johnson | | H04M 3/2281 |
| | | | | 705/1.1 |
| 2010/0105416 A1* | 4/2010 | Nadler | | H04M 1/72572 |
| | | | | 455/456.4 |
| 2012/0009937 A1* | 1/2012 | Daly | | H04W 48/04 |
| | | | | 455/456.1 |
| 2012/0014517 A1* | 1/2012 | Orr | | H04M 3/382 |
| | | | | 379/142.05 |
| 2013/0307533 A1* | 11/2013 | Keene | | G01V 3/087 |
| | | | | 324/244 |
| 2015/0077221 A1* | 3/2015 | Peters | | G07F 17/00 |
| | | | | 340/5.28 |
| 2016/0127378 A1* | 5/2016 | Gupta | | G06F 16/9535 |
| | | | | 726/4 |
| 2017/0094520 A1* | 3/2017 | Salyers | | H04W 12/08 |
| 2018/0062784 A1* | 3/2018 | Hodge | | H04K 3/825 |
| 2018/0167774 A1* | 6/2018 | Hodge | | H04W 4/023 |
| 2018/0240275 A1* | 8/2018 | Clements | | G06Q 50/26 |
| 2018/0242155 A1* | 8/2018 | Marass | | H04W 12/08 |
| 2018/0295562 A1* | 10/2018 | Hodge | | H04W 48/02 |
| 2018/0300555 A1* | 10/2018 | Hodge | | G06K 9/00771 |
| 2018/0343342 A1* | 11/2018 | Dennison | | H04N 7/15 |

* cited by examiner

INFLUENCING THE LOCATION OF CONTRABAND WIRELESS COMMUNICATIONS DEVICES WITHIN CONTROLLED-ENVIRONMENT FACILITIES

BACKGROUND

Although the terms prison and jail are used interchangeably, in most states they mean different things. Prisons are secure facilities operated by a state or federal government entity that house people who have been convicted of a felony criminal offense and are serving a sentence of one year or more. Jails are secure facilities operated by a county or city government that house arrestees who are held pending a plea agreement, trial, or sentencing, or individuals who have been convicted of a misdemeanor criminal offense and are serving a sentence of less than one year. Controlled-environment facilities, such as prisons and jails, usually allow their residents to communicate with family, friends, attorneys, and others outside the facility to allow the residents to maintain personal connections and to facilitate their transition back into society upon release. Most controlled-environment facilities allow some form of telephone calls, in-person visitation, video visitation, etc. for such communication.

The controlled-environment facilities usually prohibit residents from engaging in unauthorized communications with individuals outside of the facility. In most controlled-environment facilities, unauthorized cell phones, smartphones, tablet computing devices, and other mobile communications devices that allow a resident to circumvent the approved facility communication systems are considered contraband. Use of contraband communications devices within a controlled-environment facility may pose a security risk and may allow for continued criminal activity by the residents. Possession of a contraband communications device is considered a violation of facility rules and such devices are confiscated by the facility staff when found.

Controlled-environment facility residents obtain access to contraband devices through many different sources, such as visiting family and friends or even facility staff. Residents use the contraband communications devices to circumvent the facility's communication systems, which would otherwise limit who the resident could call and would usually allow for monitoring and/or recording of resident calls. During their communications, inmates may make incriminating admissions, commit further criminal acts, conspire to commit further criminal acts, or leave a trail of incriminating data. By circumventing the facility communication system, however, it may not be possible to monitor and detect such activities.

Authorities operating the controlled-environment facility often try to identify and block unauthorized use of contraband communications equipment. Existing methods for detecting and/or controlling access to contraband communications equipment include, for example, jamming frequencies used for cell phone communications and use of mobile detection equipment (e.g., "wands"). These methods have drawbacks. For example, jamming communication frequencies is typically illegal in the United States and can disrupt authorized communications, and mobile detection equipment usually does not work when a contraband device is powered off.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to systems and methods, which provide for identification of a controlled-environment facility resident in possession of a contraband communications device.

In an example embodiment, a method provides for identifying individuals using contraband communications devices in a controlled-environment facility. Wireless communications are intercepted using a plurality of access points positioned at different locations within the controlled-environment facility. All wireless communications are blocked in a first group of locations. Individuals assigned to the first group of locations are identified. Some or all wireless communications in a second group of locations are allowed to be completed. Individuals are identified as a possible contraband source if they move from the first group of locations to one of the second group of locations after wireless communications are allowed in the second group of locations.

The access points may be cellular system antennas and the wireless communications may be cellular telephone calls and/or electronic messages initiated on cellular telephones. The blocking and allowing wireless communications in different locations may be controlled by a managed access system.

The first and second group of locations may be housing units in the controlled-environment facility. The second group of locations may be one or more housing units in the controlled-environment facility. The individuals assigned to the first group of locations may comprise one or more controlled-environment facility residents assigned to live or work in the first group of locations or staff members assigned to work in the first group of locations or both.

The method may further comprise blocking all wireless communications in all locations before allowing some or all wireless communications in the second group of locations.

The method may further comprise using an administration and management system to identify the individuals assigned to the first group of locations and to identify the individuals who move from the first group of locations to one of the second group of locations.

The method may further comprise allowing the wireless communications in the second group of locations to be completed via one or more of the access points and/or via a commercial cellular carrier network.

The method may further comprise monitoring the wireless communications that are allowed to be completed in the second group of locations.

The method may further comprise targeting the individuals who move from the first group of locations to be searched for contraband communications devices.

In another embodiment, a method comprises deploying a distributed antenna system configured to block cellular communications within a controlled-environment facility; identifying assigned areas for individuals in the controlled-environment facility; at a specific time, begin allowing cellular communications in a designated area of the controlled-environment facility without notifying the individuals; identifying individuals who move from an assigned area outside the designated area into the designated area after cellular communications are allowed. The cellular communications may be completed via the distributed antenna system and/or via a commercial cellular carrier network.

An example managed access system for identifying a controlled-environment facility resident in possession of a contraband communications device may comprise a distributed antenna system configured to block cellular communications within the controlled-environment facility; and a facility management system configured to monitor assigned areas for individuals in the controlled-environment facility, wherein, at a specific time, the distributed antenna system begins allowing cellular communications in a designated area of the controlled-environment facility without notifying the individuals, and the facility management system identifies individuals who move from an assigned area outside the designated area into the designated area after cellular communications are allowed.

BRIEF DESCRIPTION OF THE DRAWINGS

Figure 1:
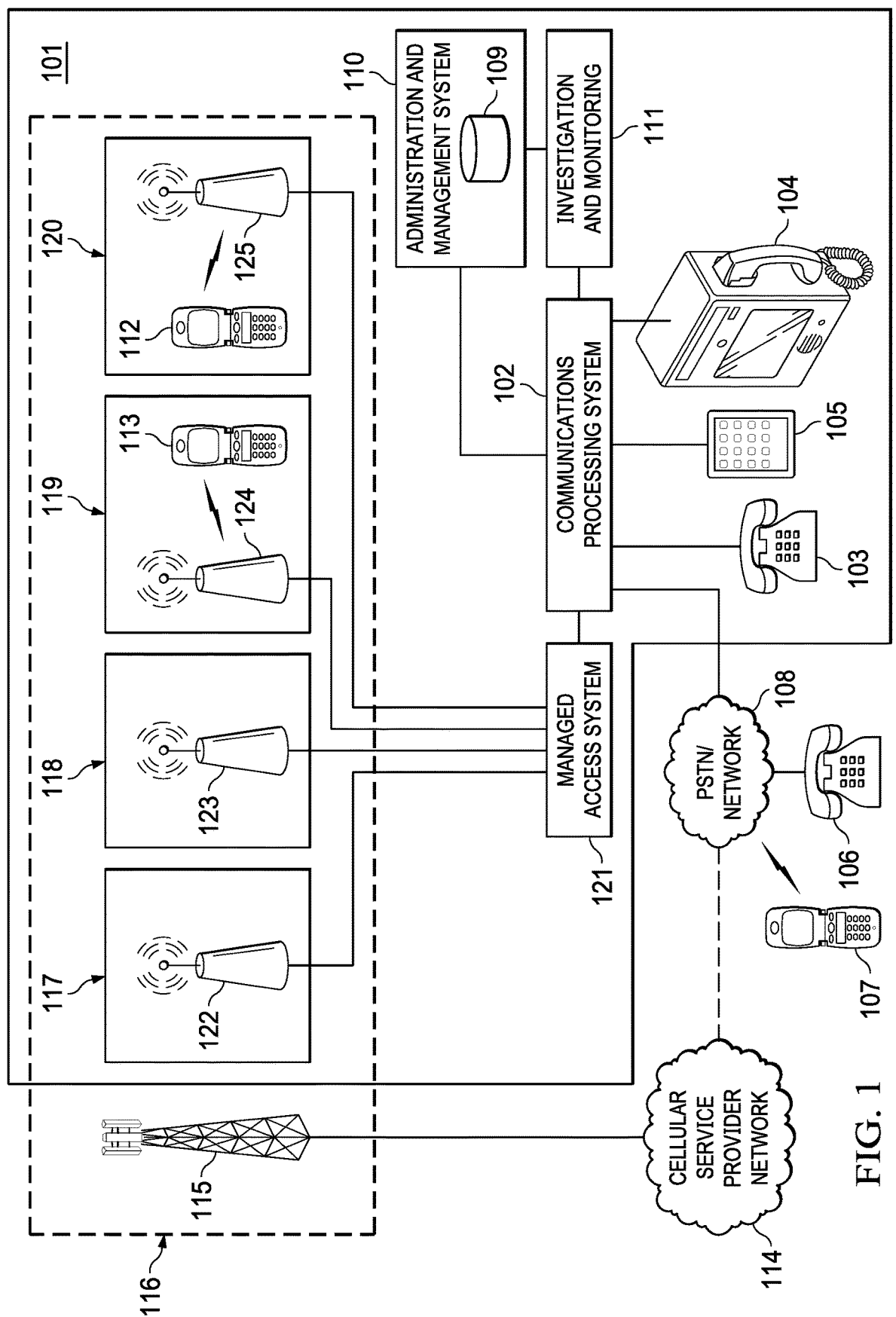

Having thus described the invention in general terms, reference will now be made to the accompanying drawings, which are not necessarily drawn to scale, and wherein:

FIG. 1 illustrates an example embodiment of systems and methods for influencing the location of contraband wireless communications devices in a controlled-environment facility.

Figure 2:
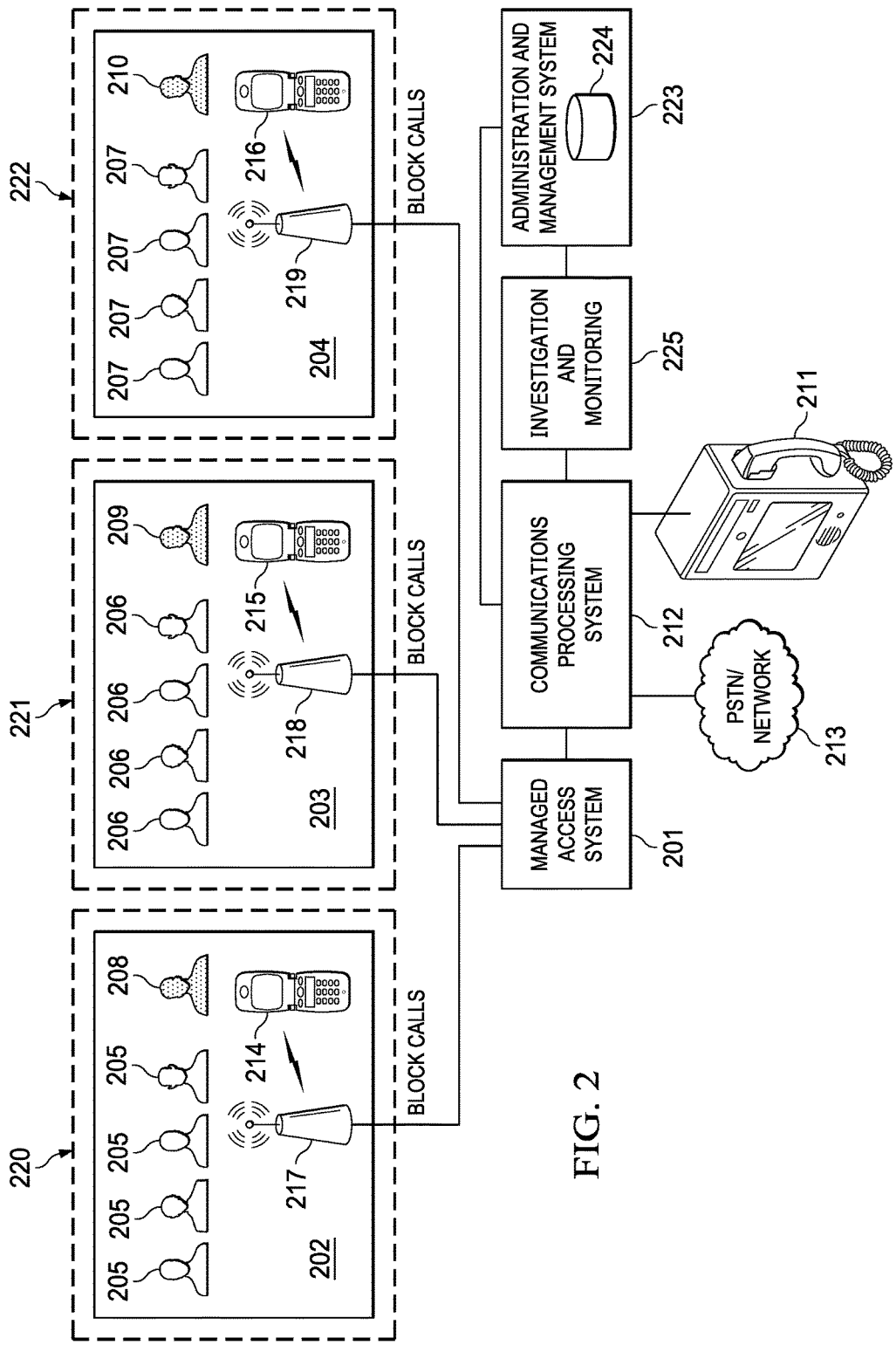

FIG. 2 is a block diagram illustrating an example managed access system deployed in a controlled-environment facility.

Figure 3:
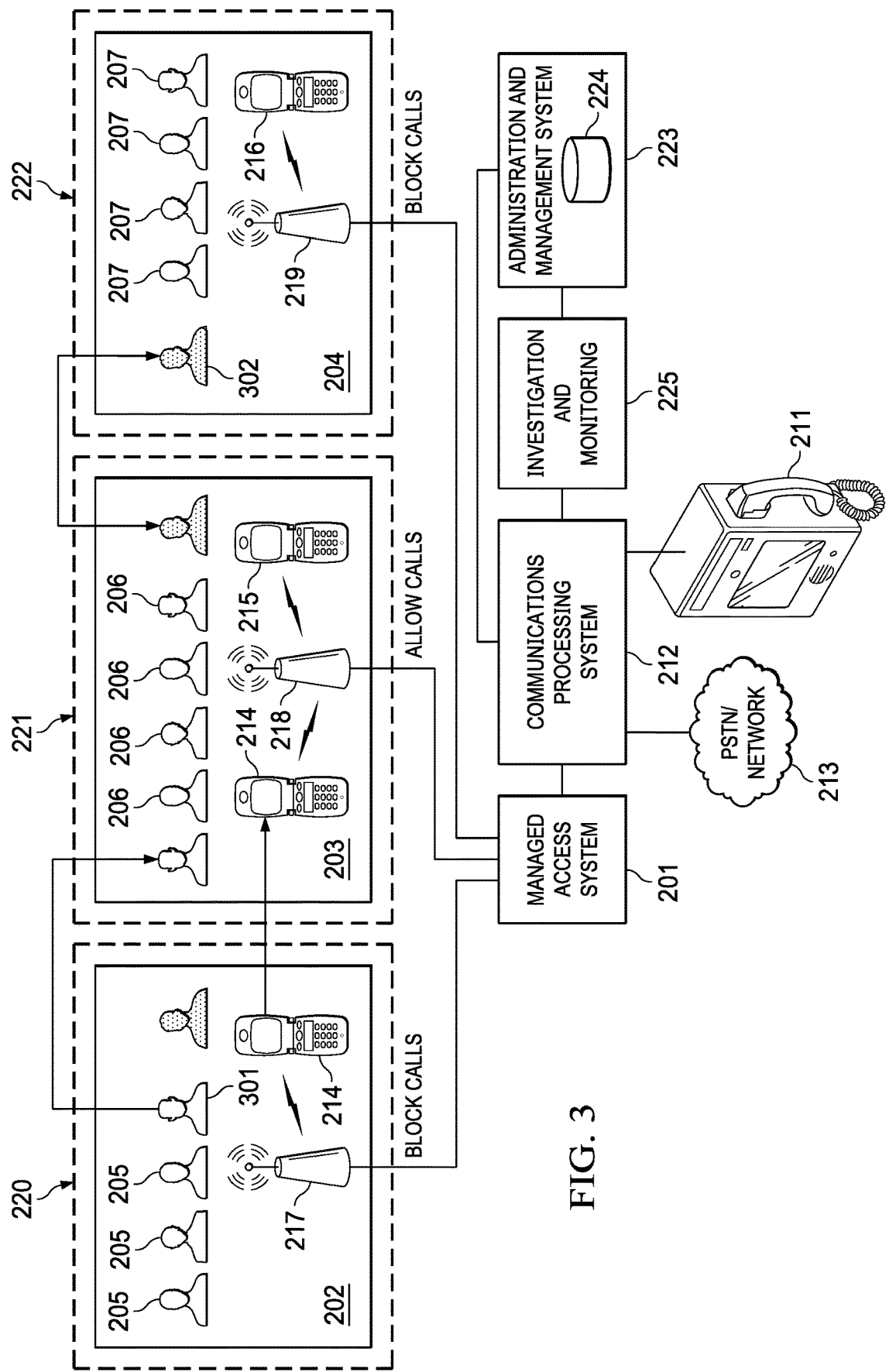

FIG. 3 is a block diagram illustrating a modification to the managed access system according to an example embodiment.

Figure 4:
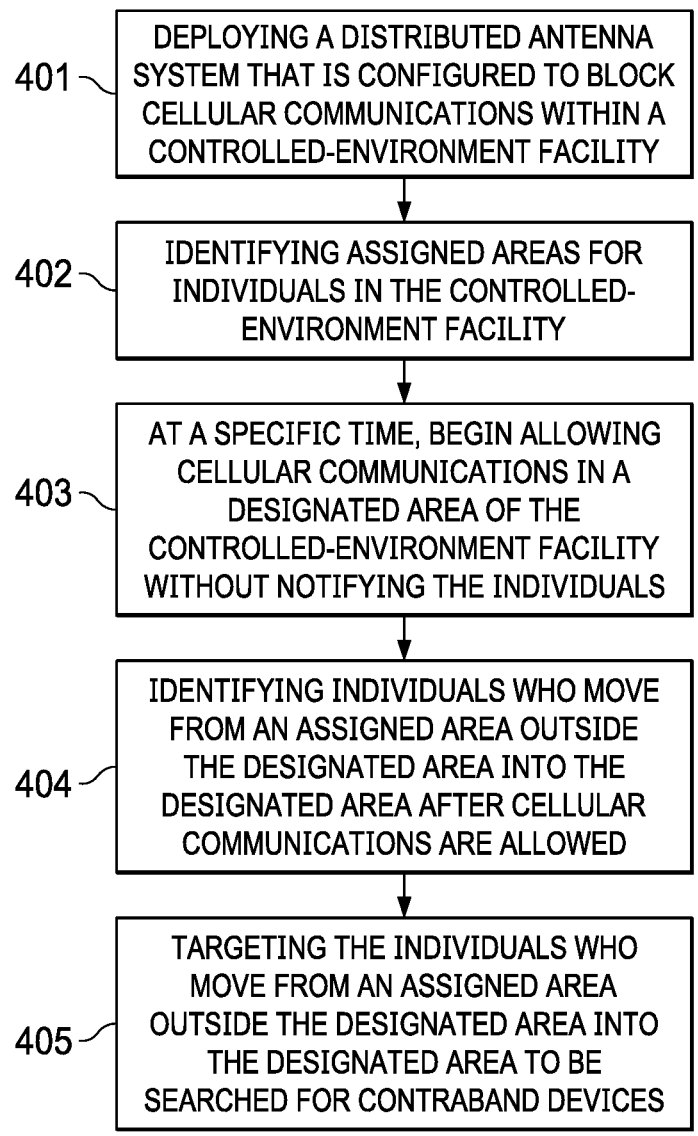

FIG. 4 is a flowchart illustrating a method for detecting individuals with contraband cellular telephones according to one embodiment.

Figure 5:
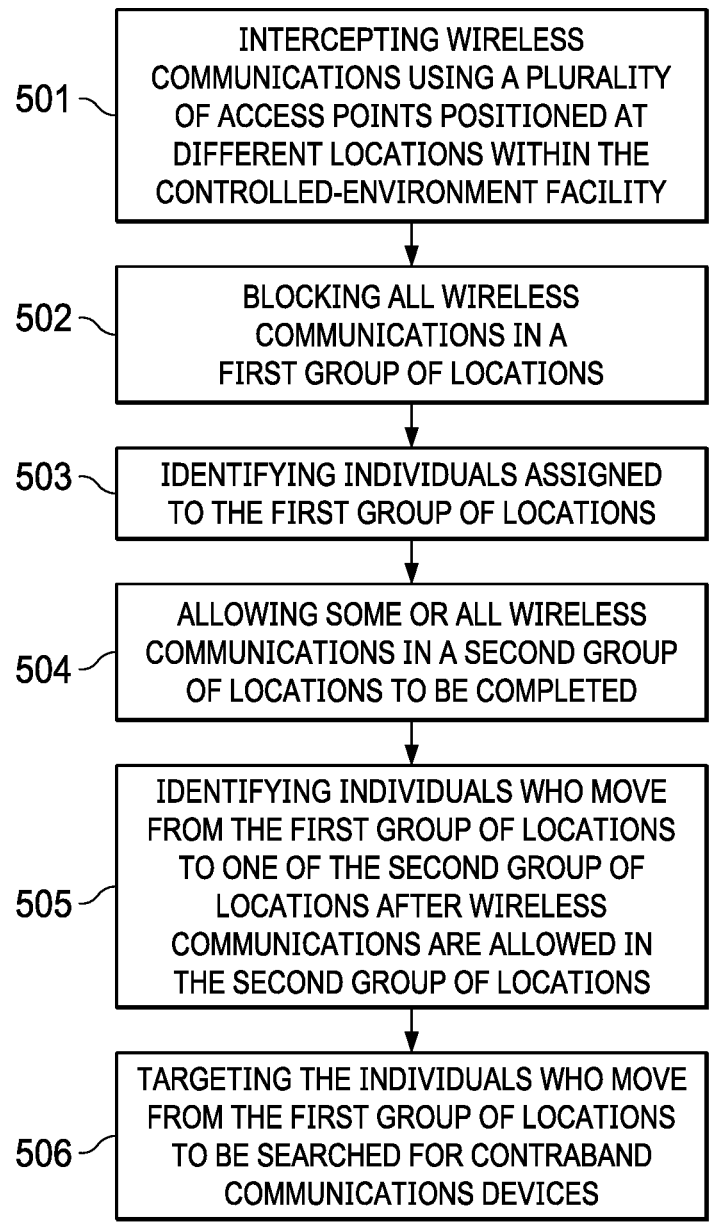

FIG. 5 is a flowchart illustrating an alternative method for detecting individuals with contraband cellular telephones according to another embodiment.

Figure 6:
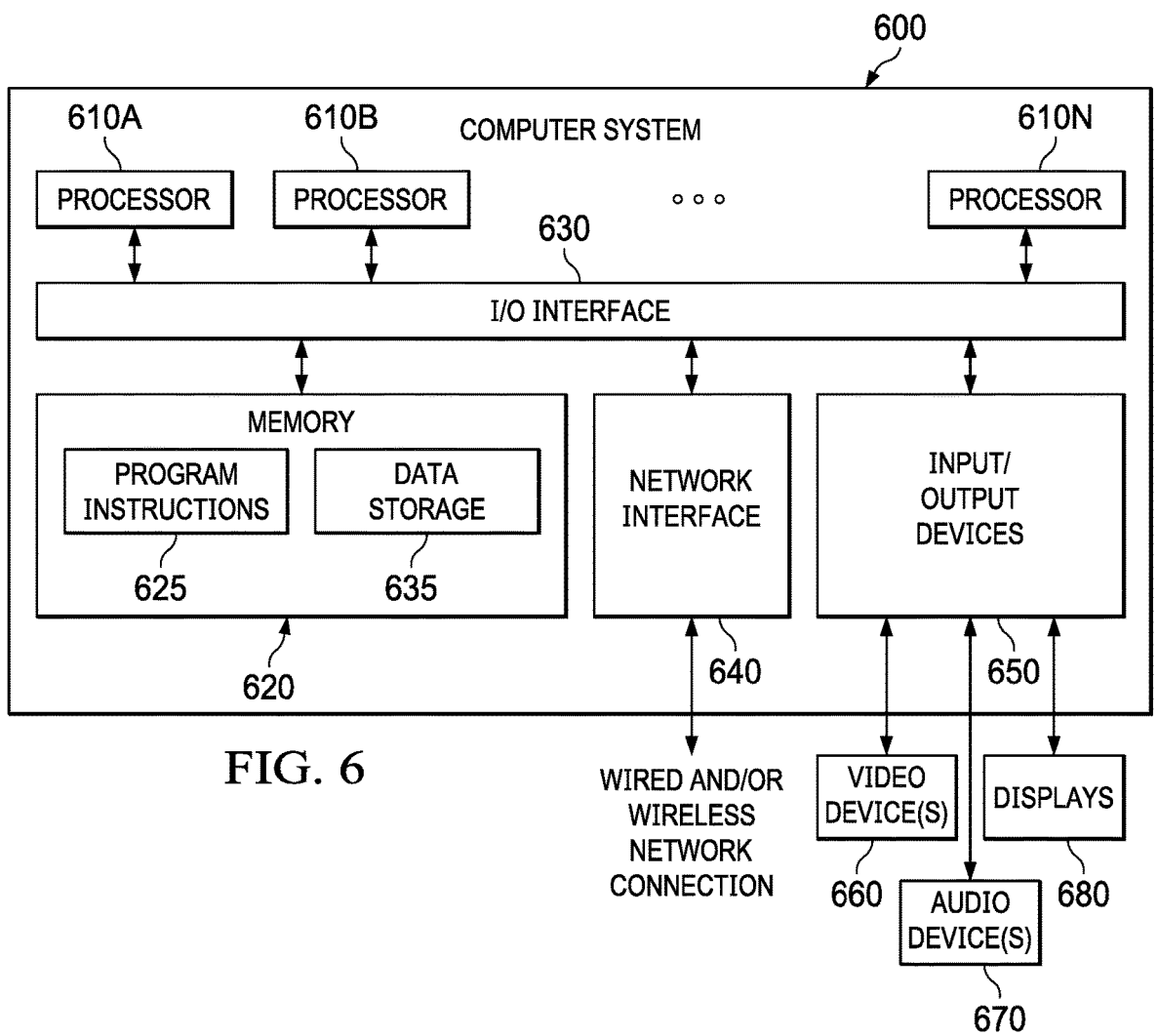

FIG. 6 is a computer system capable of supporting the embodiments disclosed herein.

While this specification provides several embodiments and illustrative drawings, a person of ordinary skill in the art will recognize that the present specification is not limited only to the embodiments or drawings described.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention. The drawings and detailed description are not intended to limit the specification to the particular form disclosed, but, on the contrary, the intention is to cover all modifications, equivalents and alternatives falling within the spirit and scope of the claims.

As used herein, the term "controlled-environment facility" refers to any location for which there are restrictions on who can enter or leave. Additionally, there may be restrictions on what personal property, if any, is allowed within a controlled-environment facility. There are various types of controlled-environment facilities and people may be voluntary or involuntary residents of such facilities, whether temporarily or permanently. For example, controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, schools, dormitories, barracks, etc.), and the like. As used herein, the term "resident" as applied to a controlled-environment facility refers to any person within such facilities voluntarily or involuntarily and temporarily or permanently. For example, residents may include inmates, prisoners, guards, and staff in correctional institutions, patients, doctors, nurses, and other medical staff in healthcare facilities, and students, teachers, and counselors in restricted living quarters.

For convenience of explanation, the various examples discussed herein are presented in the context of correctional facilities or the like. For instance, in some of the embodiments discussed below, a controlled-environment facility may be referred to as a correctional facility, jail, or prison, and its residents may be referred to as inmates, prisoners, arrestees, or detainees. It should be understood, however, that the systems and methods described herein may be similarly applicable to other types of controlled-environment facilities and their respective residents.

In the law enforcement/correctional institution context, the staff of a controlled-environment facility needs to detect those residents who have contraband cell phones and other communication devices in order to prevent unauthorized communications, which often involve illegal activity. In the context of healthcare facilities or restricted living quarters, medical staff or teachers may want to limit patient or student use of unauthorized or unmonitored communications to maintain a treatment plan or to control an academic environment. The present disclosure relates generally to controlled-environment facilities and, more specifically, to identifying residents who possess contraband wireless communications devices.

FIG. 1 is a diagrammatic illustration of a controlled-environment facility 101 having an example embodiment of systems and methods for influencing the location of contraband wireless communications devices. A communications processing system 102 provides communications for controlled-environment facility 101. This may include, for example, telephone services, videoconferencing, online chat, text/SMS messaging, and other forms of communications between residents and/or staff of controlled-environment facility 101 and individuals located outside the facility. In some embodiments, communications processing system 102 may be co-located with controlled-environment facility 101, as illustrated. Alternatively, communications processing system 102 may be centrally or remotely located with respect to one or more controlled-environment facilities and may provide communication services to multiple controlled-environment facilities. More generally, it should be noted that communications processing system 102 may assume a variety of forms, and may be configured to serve a variety of facilities and/or users, whether within or outside of a controlled-environment facility.

Residents access communication services using telephones 103, video visitation or Intelligent Facility Devices (IFD) 104, and/or tablet devices 105 that are adapted and approved for use in controlled-environment facility 101. For example, a resident initiating an approved telephone call may lift the receiver on telephone 103 or IFD 104 or may launch a communication application program on device 105. The resident may then be prompted to provide a personal identification number (PIN), other identifying information or biometrics. An interactive voice response (IVR) unit (not shown) may generate and play prompts or other messages to residents on devices 103, 104 and/or 105 to facilitate, authorize, and/or complete the communication connections.

Under the control of communication processing system 102, devices 103, 104 and 105 may connect to a non-resident's (e.g., any person not located within the controlled-environment facility) telephone 106, wireless device 107, or other communication device via network 108. The non-resident device may be accessed using any network 108, such as a publicly switched telephone network (PSTN), an Integrated Services Digital Network (ISDN), Voice-over-IP (VoIP) network, or packet data network, such as, the Internet.

In addition to providing certain communication and visitation operations, communication processing system 102 typically ensures that the residents' calls, video conferences, online chats, text messages, etc. are connected only to non-residents whose identities, devices, email addresses, phone numbers, etc. are listed in that resident's pre-approved contact (PAC) or personal allowed numbers (PAN) list. The PAC/PAN may be a whitelist or a blacklist that identifies contacts that are allowed or restricted for the resident. Each resident's PAN list may be stored, for example, in a database 109 that is maintained by an administration and management system (AMS) 110, a jail management system (JMS), or the like. In addition to PAN lists, AMS 110 may also store inmate or resident profile data (RPD), such as balances for inmate trust and calling accounts, trial schedule, conviction data, criminal record, sentencing data, time served, time remaining to be served, release date, cell and cellmate assignments, resident restrictions and warnings, commissary order history, telephone call history, call recordings, known or suspected gang or criminal affiliations, known or suspected affiliates or accomplices, and any other information that may be relevant or useful to correctional facility staff. In scenarios where communication system 102 is located within the controlled-environment facility 101, it may have direct access to AMS 110. In other embodiments, however, communication system 102 may also be located remotely from the controlled-environment facility 101 and access to AMS 110 may be accomplished via a computer network such as, for example, network 108.

In some embodiments, communication system 102 is configured to monitor and/or record the residents' telephone and/or video visitations. An investigation and monitoring module 111 may record all or some resident communications. The communications may be monitored in real-time by an investigator or automatically monitored to detect the use of selected keywords, for example. The content and metadata associated with the residents' communications may be recorded and stored for later analysis, review, or investigation.

Most controlled-environment facilities restricted residents from communicating with persons outside of the facility using any device other than the system described above (i.e., communication processing system 102, and devices 103, 104 or 105). The reasons for this include protection of persons outside of the controlled-environment facility from offensive, inappropriate, or illegal contact with a resident. Additionally, these restrictions prevent residents from directing further illegal activity with conspirators located outside of the controlled-environment facility and from avoiding monitoring of resident communications. Administrators of the controlled-environment facility may wish to limit the residents' contact to individuals on the resident's PAN list. Nonetheless, residents often find ways of bypassing the approved communication system. For example, contraband wireless devices 112, 113 are often smuggled into controlled-environment facilities.

Contraband wireless devices 112, 113 allow residents to bypass communication processing system 102 and instead establish communication with others using a third-party cellular service provider's network 114, such as any of the well-known and widely available cellular providers in the United States. One or more antenna towers 115 provide telephone service in an area or cell 116 overlapping some or all of controlled-environment facility 101. When the contraband wireless devices 112, 113 are turned on, they connect to cellular phone service provider's network 114 via antenna tower 115 and allow for a resident's communications to be routed through network 114. This allows residents with contraband wireless devices 112, 113 to contact telephone 106 or wireless device 107 directly without any monitoring or control by communication processing system 102.

Controlled-environment facility 101 comprises several resident housing units 117-119, which may be referred to as pods, sections, units, dormitories, or blocks, for example. These housing units may be distributed across different buildings, wings, or floors of controlled-environment facility 101. Controlled-environment facility 101 also comprises various common spaces 120, such as dining halls, recreation areas, medical facilities, etc. In some controlled-environment facilities, a managed access system (MAS) 121 may be used to intercept and manage communications initiated from contraband communications devices 112, 113. The managed access system 121 may employ one or more cellular access points 122-125 as part of a distributed antenna system. In one embodiment, access points 122-125 may be cellular antennas that function as microcells or picocells that provide coverage for mobile telephone service over limited areas. For example, a dedicated cellular access point 122 may be placed within housing unit 117 so that all wireless communications devices within housing unit 117, including any contraband communications devices, will identify cellular access point 122 as the primary base station for communications. Other dedicated cellular access points 123-125 may be placed within housing units 118, 119 and common area 120 so that all wireless communications devices within those areas will identify the respective cellular access point as the primary base station for communications.

In certain embodiments, the power levels associated with cellular access points 122-125 may be adjusted such that the geographical area of the wireless cell coverage corresponds generally to the respective housing unit 117-119 or common area 120. Thus, all cellular communications originating from within a particular housing unit 117-119 or common area 120 are directed through managed access system 121 through a specific cellular access point 122-125 that is associated with that unit or area. Each cellular access point's power may be configured so that wireless devices within a particular unit will register with a specific cellular access point and not with a cellular access point in a neighboring unit or with a third-party cellular service provider's tower 115. This allows managed access system 121 to control whether radio resources and communication traffic channels are assigned when wireless devices within each unit or area of controlled-environment facility 101 attempt to initiate a call.

By controlling call initiation, managed access system 121 can control and manage communications initiated within controlled-environment facility 101. Calls initiated by, or directed to, contraband communications devices 112, 113 can be blocked without impacting legitimate wireless communications, such as calls from the facility staffs' wireless devices or from approved communications devices 105. Additionally, managed access system 121 can be configured to allow calls from only within designated areas of the controlled-environment facility 101.

Managed access system 121 and associated access points 122-125 may be a combination of a cellular telephone system network and a tightly controlled distributed antenna system. Managed access system 121 may employ any 2G, 3G, 4G and/or 5G technologies and protocols that are used by wireless telephone service providers. Almost all mobile phones use cellular technology, such as Global System for Mobile Communications (GSM) or code-division multiple access (CDMA) technology. However, it will be understood that the managed access system 121 disclosed herein can be used with any current, legacy, or future cellular technology or protocols, such as GSM, General Packet Radio Service (GPRS), cdmaOne, CDMA2000, Evolution-Data Optimized (EV-DO), Enhanced Data Rates for GSM Evolution (EDGE), Long Term Evolution (LTE), Universal Mobile Telecommunications System (UMTS), Digital Enhanced Cordless Telecommunications (DECT), and Digital AMPS (IS-136/TDMA). The term "contraband communications devices" as used herein may refer to any unauthorized cellular telephone, mobile telephone, smartphone, portable personal computer, or other device that supports wireless communication.

In some embodiments, managed access system 121 may capture data from contraband communications devices 112, 113, such as an International Mobile Equipment Identifier (IMEI), Mobile Subscriber Integrated services Digital Network Number (MSIDN), Mobile Equipment IDentifier (MEID), Equipment Serial Numbers (ESN), International Mobile Subscriber Identity (IMSI), or Temporary Mobile Subscriber Identity (TMSI) assigned to the device, dialed telephone numbers, message addresses, and the like.

Managed access system 121 may apply policy rules as determined by controlled-environment facility administrators, which may be enforced by AMS 110 via communications processing system 102. The policy rules as applied to contraband communications devices 112, 113 may, for example, allow calls, messages, or data to be connected to called parties, require blocking calls or messaging attempts, allow for monitoring of call, message, or data content, and/or recording of calls, messaging, or data communication content. The policy rules may be applied in different ways across controlled-environment facility 101 so that communications initiated by contraband communications devices 112, 113 within different housing units or common areas are treated in a different way depending upon a device's location. For example, calls may be allowed, monitored, and recorded for devices in housing unit 117, but blocked in housing units 118, 119 and common area 120.

A typical controlled-environment facility 101, such as a jail or prison, houses residents for long periods and has a large staff to support this effort. The staff includes correctional officers, guards, maintenance workers, administrative personnel, counselors, teachers, etc. Unfortunately, some controlled-environment facility staff are corrupt and will participate in criminal or unauthorized activity with residents, such as smuggling drugs or cell phones into the facility in exchange for money, favors, or other benefits. The criminal or unauthorized activity may be controlled by a staff member or by a resident. The staff may agree to cooperate with residents voluntarily or may be coerced or blackmailed into such cooperation.

A corrupt staff member will likely work to maintain control over any residents who are participating in criminal or unauthorized activity and thereby continue the flow of money from the distribution of contraband materials. One way that staff can control or influence residents is by managing where the resident is housed in the facility. In a typical controlled-environment facility 101, the administration conducts a count or census daily to determine where each resident is housed. The daily location and schedule for each inmate may be logged by AMS 110. The facility administration initially selects the housing location of each new resident, which may be based, for example, upon bed availability, the resident's conviction status, crimes, or term of incarceration, or the need to control the distribution of different gangs or other groups within the facility. Subsequently, residents may be moved to other locations for similar reasons. The residents themselves might prompt moves to new housing locations. For example, the residents' actions, such as causing trouble or conflict in a current location, may result in a move to a new location. Facility staff may also initiate a resident's move. When the resident is moved, their location is updated in the AMS 110 database 109, which allows their location to be monitored over time.

The staff members are typically assigned to specific locations within controlled-environment facility 101, such as a particular housing unit or common area. Management systems AMS 110 may track staff assignments and schedules in addition to storing resident data. This allows a staff member's assigned location or responsibilities within the facility to be monitored and tracked over time. A corrupt staff member who is working with a resident in a criminal enterprise may cause the resident to be moved to a more convenient housing location. Corrupt staff members might also change their assignments or shifts to position themselves closer to, or in more frequent contact with, certain residents.

FIG. 2 is a block diagram illustrating an example managed access system 201 deployed in a controlled-environment facility. Housing units 202-204 are pods, sections, units, dormitories, or blocks that house groups of residents 205-207. Facility staff 208-210, such as correctional officers or guards, are also assigned to work certain shifts in the housing units 202-204. Administrative and management system 223 maintains a database 224 of facility information, such as each resident's assigned housing unit, staff schedules, resident calling privileges, etc. The residents may be allowed to use approved devices 211, such as telephones or video visitation terminals, to call family, friends, attorneys, and others outside the facility. Approved device 211 is controlled by communications processing system 212, which facilitates communications with parties outside the facility via the PSTN or packet network 213.

Managed access system 201 may also work with communications processing system 212 to control (allow, block, monitor, etc.) calls from unauthorized cell phones 214-216 in housing units 202-204. Managed access system 201 includes cellular access points 217-219 that are deployed in each housing unit 202-204. As described above, cellular access points 217-219 and managed access system 201 capture call initiation messages from unauthorized cell phones 214-216. Each cellular access points 217-219 provides coverage in a cell 220-222 that approximately overlaps the associated housing unit 202-204. Facility policies are used to determine if unapproved calls should be connected to called parties through communications processing system 212 or should be blocked. In one embodiment, managed access system 201 blocks calls from unauthorized cell phones 214-216 as a default condition. An investigation and monitoring module 225 allows investigators to analyze information about unauthorized call attempts that is collected by managed access system 201 and communications processing system 212.

FIG. 3 is a block diagram illustrating a modification to the managed access system 201 according to an example embodiment. Cellular access points 217, 219 in housing units 202, 204 continue to intercept and block outgoing calls, which renders unauthorized cell phones 214, 216 unusable. However, managed access system 201 now allows calls routed through cellular access point 218 to be connected to outside parties—i.e., managed access system 201 has opened a "hole" in the cellular service coverage. As a result, unauthorized cell phone 215 is useable if it is within cell coverage area 221. It is expected that the residents 206 in housing unit 203 would quickly realize that unauthorized cell phone 215 is not blocked. To the residents, this might appear to be the result of broken equipment or improved commercial cellular coverage instead of an intentional act by the managed access system 201. The number of call attempts from unauthorized cell phone 215 would likely increase after the hole is opened. Information, such as call data and content, may be captured from calls initiated from within the hole and provided to investigation and monitoring module 225. The hole in coverage may allow calls from unauthorized cell phone 215 to be completed via access point 123 or via a commercial cellular network 114 via tower 115. The calls may include voice telephone calls as well as messaging (e.g., SMS, text, or email) or communications from applications running on the unauthorized cell phone 215 (e.g., data from a social media app sent to a remote server or host).

Residents 206 from housing unit 203 interact with other residents 205, 207, such as while eating, working, exercising, or during other interactions in common areas of the facility. The news that unauthorized cell phone calls can be successfully initiated from housing unit 203 would spread by word-of-mouth throughout the facility and eventually become widely known to residents in other housing units. Over time, residents who want the ability to make unauthorized cell phone calls will attempt to move to housing unit 203. These residents may engineer their own move. For example, inmate 301 may cause a disruption in housing unit 202 thereby forcing the facility staff to move the resident. In some cases, resident 301 may be moved directly to housing unit 203. In other cases, resident 301 may be moved to another housing unit, such as unit 204, and may cause additional disruptions to force additional moves until he ends up in housing unit 203. Corrupt staff may also be responsible for moving resident 301 to housing unit 203.

In different controlled-environment facilities, there may be other ways of detecting patterns of residents' moving among housing units. Residents may request a move. In some correctional facilities, for example, an inmate may move every six months on their own request. The inmates are scored based on age and crime committed, for example, to determine their eligibility to move. Residents may be moved for disciplinary reasons, or they may plant contraband to prompt a move. Residents may also be moved for safety or therapeutic reasons. For example, a resident who was assaulted or raped may file a Prison Rape Elimination Act (PREA) request to move to a new housing unit, or a case worker may request that the resident be moved. Any of these resident moves may coincide with movement of an unauthorized device from one location to another within the facility.

The ability for successful cell calls within housing unit 203 may or may not be made known to the facility staff. In some cases, to investigate staff behavior, facility administrators may not notify all staff of the change. It can be expected that the facility staff will eventually learn from residents that unauthorized cell phone calls are being made from housing unit 203. When a corrupt staff member learns this information, they may work to move certain residents to housing unit 203 to further criminal or unauthorized activities. The corrupt staff member may also cause himself to be assigned to housing unit 203 to take advantage of the unauthorized cell phone calling capability in that unit. For example, corrupt staff member 302, who is usually assigned to another housing unit 204, may request an assignment change or ask to change shifts to be assigned to housing unit 203. The corrupt staff member 302 may use the new assignment as an opportunity to sell unauthorized cell phones to residents or otherwise take advantage of residents.

In addition to resident and staff moves, the managed access system 201 may observe cell phone movement within the controlled-environment facility. For example, managed access system 201 and cellular access point 217 may first detect and block calls initiated by unauthorized cell phone 214 within cell 202, which indicates that the device is in housing unit 202. After calls begin to be successfully initiated within housing unit 203, managed access system 201 and cellular access point 218 may start to detect calls from unauthorized cell phone 214. Cell phones are relatively small and easily hidden. Resident 301 or corrupt staff 302 may bring unauthorized cell phones with them to housing unit 203. Alternatively, residents—and corrupt staff—may secretly pass the contraband devices among themselves and smuggle contraband cell phones from one housing unit or common area to another. Even if residents or staff are not able to move to housing unit 203, they may coordinate or assist in moving unauthorized cell phones to the hole in cellular service blocking.

In one embodiment, the controlled-environment facility administration and/or investigators may use selectively opened holes in the cellular service blocking to locate contraband communications devices and/or to detect other criminal or unauthorized activity in the controlled-environment facility. By analyzing the resident and staff moves that occur after a hole has been opened—i.e., after cell phone calls are allowed from a selected housing unit—the facility administration or investigators can identify residents who may have unauthorized cell phones and/or staff who may be corrupt.

Table 1 illustrates a comparison of data collected before and after the hole is opened in housing unit 203 by manage access system 201. Residents A, B, D, and E were assigned to housing unit 203 before the hole was opened and continued to reside there after the hole was opened. Such residents might or might not be using unauthorized cell phones after the hole was opened. These residents are not necessarily subject to any heightened suspicion compared to an average resident of the facility based upon their location. Resident C has left unit housing to be released or was moved to another unit. This resident would not necessarily be subjected to any heightened suspicion and may be subjected to less suspicion since they no longer are able to take advantage of the hole in cellular service coverage. However, residents F and G are new to housing unit 203 after the hole is opened and, therefore, may be subject to heightened scrutiny. In particular, if these residents were moved from other units in the facility, then they may be more likely to have moved to take advantage of the unauthorized cell phone use that is now possible in unit 203. Residents F and G may be subject to additional investigation, such as searches of their cell and belongings, and closer monitoring for use of unauthorized cell phones.

TABLE 1

| HOUSING UNIT COUNT BEFORE HOLE IS OPENED | HOUSING UNIT COUNT AFTER HOLE IS OPENED |
|---|---|
| Resident A | Resident A |
| Resident B | Resident B |
| Resident C |  |
| Resident D | Resident D |
| Resident E | Resident E |
|  | Resident F |
|  | Resident G |

Table 2 illustrates a comparison of staff member assignments in terms of shifts per month before and after the hole is opened in housing unit 203. Staff members 1, 3, 5 and 6 have maintained a relatively constant presence in housing unit 203 and, therefore, are not necessarily subject to any heightened suspicion compared to an average staff member based upon their work location. Staff member 2 is no longer working in housing unit 203 and, therefore, is likely subject to less suspicion since they can no longer take advantage of the hole in cellular service coverage. On the other hand, staff members 4 and 7 have significantly increased their presence in housing unit 203, may be subject to heightened scrutiny. In particular, these staff members may be more likely to have moved to take advantage of the unauthorized cell phone use that is now possible in unit 203. Such as by bringing in additional unauthorized cell phones to sell to inmates or to control which inmates can use unauthorized cell phones.

TABLE 2

|  | FREQUENCY OF SHIFTS BEFORE HOLE IS OPENED | FREQUENCY OF SHIFTS AFTER HOLE IS OPENED |
|---|---|---|
| Staff Member 1 | 20 | 20 |
| Staff Member 2 | 10 | 0 |
| Staff Member 3 | 15 | 15 |
| Staff Member 4 | 0 | 15 |
| Staff Member 5 | 10 | 12 |
| Staff Member 6 | 12 | 9 |
| Staff Member 7 | 5 | 20 |

Although the example embodiments herein describe detection of cellular telephones (cell phones), it will be understood that cell phones are simply a common example of unauthorized communication devices that may be smuggled into a controlled-environment facility and that the present invention is not limited to detection of cellular telephones. Instead, the present invention may be used to detect any wireless communication device whether or not such device communicates over a cellular network or provides voice communications. Other wireless communication devices, including, without limitation, computers (desktop, laptop, tablet, etc.) that communicate via a wireless local area network (WLAN), pagers, personal digital assistants (PDAs), intelligent digital assistants (e.g., Siri®, Alexa™, Echo® devices), and the like. Such devices may be capable of communicating non-voice information and data, such as by sending short message service (SMS) messages, text messages, electronic mail, pager messages, or other messages or by transferring or exchanging electronic files with other devices over a wireless network.

FIG. 4 is a flowchart illustrating a method for detecting individuals with contraband cellular telephones according to one embodiment. In step 401, a distributed antenna system that is configured to block cellular communications is deployed within a controlled-environment facility. The cellular communications may comprise, for example, telephone calls, electronic messages (e.g., SMS, text, or email), or communications associated with applications running on a device (e.g., social media apps).

In step 402, assigned areas are identified for individuals in the controlled-environment facility. The assigned areas may be housing units, common areas, or workplaces in the controlled-environment facility.

In step 403, starting at a specific time, cellular communications are then allowed in a designated area of the controlled-environment facility without notifying the individuals. The cellular communications may be completed via the distributed antenna system or via a commercial cellular carrier network.

In step 404, individuals are identified if they have moved from an assigned area outside the designated area into the designated area after cellular communications are allowed. The designated areas may be housing units, common areas, or workplaces in the controlled-environment facility. The designated areas may be a subset of, or overlap, the assigned areas.

In step 405, the individuals who move from an assigned area outside the designated area into the designated area are targeted to be searched for contraband devices.

FIG. 5 is a flowchart illustrating an alternative method for detecting individuals with contraband cellular telephones according to another embodiment. In step 501, wireless communications are intercepted using a plurality of access points positioned at different locations within the controlled-environment facility. The access points may be, for example, antennas for a cellular system or base station, such as a picocell or a microcell, that support wireless communications such as cellular telephone calls, electronic messages, or data.

In step 502, all wireless communications are blocked in a first group of locations. The communications may be blocked using a managed access system that controls the plurality of access points.

In step 503, individuals who are assigned to the first group of locations are identified. The first group of locations may be, for example, housing units, common areas, or workplaces in the controlled-environment facility. The individuals may be residents assigned to live or work in the first group of locations and/or staff members assigned to work in the first group of locations. An administration and management system may be used to identify the individuals who are assigned to the first group of locations.

In step 504, some or all wireless communications initiated in a second group of locations are allowed to be completed. The second group may consist of a single location, such as a single housing unit in the facility, or multiple locations, such as multiple housing units (e.g., one opened coverage area for men and another opened coverage area for women since both groups may not be able to go to the same cellular coverage hole). The communications may be selectively allowed, for example, using a managed access system that controls the plurality of access points. The wireless communications may also or alternatively be completed via a cellular carrier network or other commercial communications network. The completed communications may be monitoring for content and other information that is useful for investigators.

In step 505, individuals are identified if they move from the first group of locations to one of the second group of locations after wireless communications are allowed. An administration and management system may be used to identify the individuals who move from the first group of locations to one of the second group of locations.

In step 506, the individuals who move from the first group of locations are targeted to be searched for contraband communications devices. The searches may include, for example, personal searches of residents and staff, shakedowns of cells, offices, and workplaces, reviews of financial account and banking data, and the like.

Embodiments of the present systems and methods for contraband wireless communications device identification in controlled-environment facilities, as described herein, may be implemented or executed, at least in part, by one or more computer systems. One such computer system is illustrated in FIG. 6. In various embodiments, computer system 600 may be a server, a mainframe computer system, a workstation, a network computer, a desktop computer, a laptop, a tablet computing device, media player, or the like. For example, in some cases, computer 600 may implement one or more steps of example process 200 described above with respect to FIGS. 2 through 5, and/or a computer system such as computer system 600 may be used as, or as part of, one or more of controlled-environment facility resident communications system 101, controlled environment facility management system 117, MAS 122, Contraband communications devices assessment system 125, and/or the like. In various embodiments two or more of these computer systems may be configured to communicate with each other in any suitable way, such as, for example, via a network, such as via local area network, and/or wireless functionality.

As illustrated, example computer system 600 includes one or more processors 610 coupled to a system memory 620 via an input/output (I/O) interface 630. Example computer system 600 further includes a network interface 640 coupled to I/O interface 630, and one or more input/output devices 650, such as video device(s) 660 (e.g., a camera), audio device(s) 670 (e.g., a microphone and/or a speaker), and display(s) 680. Computer system 600 may also include a cursor control device (e.g., a mouse or touchpad), a keyboard, etc. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

In various embodiments, computer system 600 may be a single-processor system including one processor 610, or a multi-processor system including two or more processors 610 (e.g., two, four, eight, or another suitable number). Processors 610 may be any processor capable of executing program instructions. For example, in various embodiments, processors 610 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 610 may commonly, but not necessarily, implement the same ISA. Also, in some embodiments, at least one processor 610 may be a graphics processing unit (GPU) or other dedicated graphics-rendering device.

System memory 620 may be configured to store program instructions and/or data accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described in connection with the figures described above, may be stored within system memory 620 as program instructions 625 and data storage 635, respectively. In other embodiments, program instructions and/or data may be received, sent, or stored upon different types of computer-accessible media or on similar media separate from system memory 620 or computer system 600. A computer-readable medium may include any tangible or non-transitory storage media or memory media such as magnetic or optical media—e.g., disk or CD/DVD-ROM coupled to computer system 600 via I/O interface 630, Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 640.

In some embodiments, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any suitable protocol, timing, or other data transformations to convert data signals from one component (e.g., system memory 620) into a format usable by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. In addition, in some embodiments, some or all of the functionality of I/O interface 630, such as an interface to system memory 620, may be incorporated into processor 610.

Network interface 640 may be configured to allow data to be exchanged between computer system 600 and other devices attached to a network, such as other computer systems, or between nodes of computer system 600. In various embodiments, network interface 640 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

As shown in FIG. 6, memory 620 may include program instructions 625, configured to implement certain embodiments described herein, and data storage 635, comprising various data accessible by program instructions 625. In an embodiment, program instructions 625 may include software elements corresponding to one or more of the various embodiments illustrated in the above figures. For example, program instructions 625 may be implemented in various embodiments using any desired programming language, scripting language, or combination of programming languages and/or scripting languages (e.g., C, C++, C#, JAVA®, JAVASCRIPT®, PERL®, etc.). Data storage 635 may include data that may be used in these embodiments. In other embodiments, other or different software elements and data may be included.

A person of ordinary skill in the art will appreciate that computer system 600 is merely illustrative and is not intended to limit the scope of the disclosure described herein. The computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions, and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method, comprising:
   blocking cellular communications within a controlled-environment facility using a distributed antenna system;
   identifying assigned areas for individuals in the controlled-environment facility;
   at a specific time, allowing cellular communications in a designated area of the controlled-environment facility without notifying the individuals; and
   identifying re-assignment individuals from their respective assigned area into the designated area after cellular communications are allowed.

2. The method of claim 1, wherein the cellular communications comprise telephone calls or electronic messages.

3. The method of claim 1, wherein the assigned areas and the designated area are housing units in the controlled-environment facility.

4. The method of claim 1, wherein the assigned areas and the designated area are common areas or workplaces in the controlled-environment facility.

5. The method of claim 1, further comprising:
   allowing the cellular communications to be completed via the distributed antenna system.

6. The method of claim 1, further comprising:
   allowing the cellular communications to be completed via a commercial cellular carrier network.

7. The method of claim 1, further comprising:
   targeting the individuals who move from an assigned area outside the designated area into the designated area to be searched for contraband devices.

8. A managed access system for identifying a controlled-environment facility resident in possession of a contraband communications device, the system comprising:
   a distributed antenna system configured to block cellular communications within the controlled-environment facility; and
   a facility management system configured to monitor assigned areas for individuals in the controlled-environment facility;
   wherein, at a specific time, the distributed antenna system begins allowing cellular communications in a designated area of the controlled-environment facility without notifying the individuals, and the facility management system identifies re-assignment of individuals from respective assigned areas to the designated area after cellular communications are allowed.

9. A computer-readable storage device having instructions stored thereon, wherein execution of the instructions by one or more processors causes the one or more processors to:
   block cellular communications within a controlled-environment facility using a distributed antenna system;
   identify assigned areas for individuals in the controlled-environment facility;
   at a specific time, allow cellular communications in a designated area of the controlled-environment facility without notifying the individuals; and
   identify re-assignment of individuals from respective assigned areas to the designated area after cellular communications are allowed.

10. The computer-readable storage device of claim 9, wherein the distributed antenna system comprises cellular system antennas and the cellular communications are cellular telephone calls.

11. The computer-readable storage device of claim 9, wherein the distributed antenna system comprises cellular system antennas and the cellular communications are electronic messages initiated on cellular telephones.

12. The computer-readable storage device of claim 9, wherein blocking and allowing cellular communications in different locations is controlled by a managed access system.

13. The computer-readable storage device of claim 9, wherein the first and second group of locations are housing units in the controlled-environment facility.

14. The computer-readable storage device of claim 9, wherein the second group of locations is one or more housing units in the controlled-environment facility.

15. The computer-readable storage device of claim 9, wherein the instructions further cause the one or more processors to:
   block all cellular communications in all locations before allowing some or all cellular communications in the second group of locations.

16. The computer-readable storage device of claim 9, wherein the individuals assigned to the first group of locations comprise one or more controlled-environment facility residents assigned to live or work in the first group of locations or staff members assigned to work in the first group of locations or both.

17. The computer-readable storage device of claim 9, wherein the instructions further cause the one or more processors to:

identify the individuals assigned to the first group of locations and to identify the individuals who move from the first group of locations to one of the second group of locations.

18. The computer-readable storage device of claim 9, wherein the instructions further cause the one or more processors to:

allow the cellular communications in the second group of locations to be completed via one or more access points of the distributed antenna system.

19. The computer-readable storage device of claim 9, wherein the instructions further cause the one or more processors to:

allow the cellular communications in the second group of locations to be completed via a commercial cellular carrier network.

20. The computer-readable storage device of claim 9, wherein the instructions further cause the one or more processors to:

monitor the cellular communications that are allowed to be completed in the second group of locations.

21. The computer-readable storage device of claim 9, further comprising:

targeting the individuals who move from the first group of locations to be searched for contraband communications devices.

* * * * *